United States Patent [19]

Wragg

[11] 4,000,914
[45] Jan. 4, 1977

[54] VEHICLE SUSPENSIONS
[76] Inventor: Ronald Wragg, Bellevue House, Waterloo Road, Matlock Bath, Derbyshire, England
[22] Filed: Dec. 12, 1974
[21] Appl. No.: 532,190
[30] Foreign Application Priority Data
  Dec. 20, 1973 United Kingdom ............ 59145/73
[52] U.S. Cl. .............................. 280/716; 267/63 A
[51] Int. Cl.² ........................................ B60G 11/24
[58] Field of Search ............... 267/63 R, 63 A, 153; 280/124 R, 124 B, 716, 717

[56] References Cited
UNITED STATES PATENTS

| | | | |
|---|---|---|---|
| 2,655,005 | 10/1953 | Kinneman | 267/63 A |
| 3,012,768 | 12/1961 | Heinmiller | 267/63 A |
| 3,017,195 | 1/1962 | Hickman | 267/63 A |
| 3,246,718 | 4/1966 | Kozicki | 280/124 R |
| 3,482,852 | 12/1969 | Hickman | 280/124 R |
| 3,495,848 | 2/1970 | Hickman | 280/124 R |
| 3,811,700 | 5/1974 | Moore | 280/124 R |
| 3,830,515 | 8/1974 | Wragg | 280/104.5 R |

*Primary Examiner*—Philip Goodman
*Assistant Examiner*—John A. Carroll
*Attorney, Agent, or Firm*—Marshall & Yeasting

[57] ABSTRACT

The vehicle suspension system includes an axle structure comprising at least one axle, and a vehicle-supporting frame structure. A pair of mountings pivotally support the frame structure on the axle structure at each end of the axle. Each mounting consists of a pair of spring members, located adjacent to one end of said axle, each of which extends between a rigid portion of the axle structure and a rigid portion of the frame structure and comprises a plurality of rigid plates separated in a sandwich-type structure by blocks of resilient material secured to each adjacent plate. The axes of each pair of spring members extend transversely to the direction of travel of the vehicle and are upwardly inclined relative to each other at equal and opposite angles, and each spring member is designed to operate under compression and shear to support the frame structure, but has relatively little torsional resistance so that it operates as a pivotal support.

6 Claims, 12 Drawing Figures

VEHICLE SUSPENSIONS

This invention relates to vehicle suspension systems.

Hitherto in suspension systems using so-called solid rubber spring units the spring units have been mounted longitudinally so that in addition to taking the load applied to the vehicle, they also stabilize the vehicle axle in respect of the fore and aft movement generated by drive reaction and braking. However the rubber spring units which are designed to operate under compressive and shear forces when mounted longitudinally, give very little transverse stabilization, and hitherto it has been necessary to utilize anti-roll bars to stabilize the vehicle transversely.

With the advent of containerisation, the centre of gravity of loaded vehicles has tended to become higher, and consequently the problem of transverse stabilization, that is the prevention of roll, has become extremely important.

The present invention is intended to mitigate this problem, and also avoid the need to use anti-roll bars.

The invention provides a vehicle suspension system including an axle adapted to be mounted to a vehicle chassis so that the axle extends at right angles to the direction of movement of the vehicle in use, and at least one pair of spring members connected to the axle and arranged such that in use their axes extend transversely of the direction of movement of the vehicle. The spring members are preferably arranged so that their axes extend at right angles to the direction of movement of the vehicle in use, that is in the vertical axial plane of the axle or in a plane parallel thereto, or may be angled forwardly or rearwardly relative to the axle.

In one arrangement the axle is rigidly mounted on a sub-frame to form a suspension unit which is adapted to be secured directly to the vehicle chassis frame by means of said spring members. In an alternative arrangement the axle is mounted on a sub-frame by means of said spring members to form a suspension unit which may then be rigidly secured to a vehicle chassis.

The axis of each spring member is preferably inclined upwardly from the axle. The angle of inclination between the axes of the spring members and the vertical, may be varied to suit different vehicle loads, the angle being decreased to cope with greater loads. In practice the angle between the axes of the spring members and the vertical is preferably from 17° to 27°. The spring members are preferably arranged in pairs, one pair at each end of the axle, the axes of the members forming each pair being inclined towards one another.

The spring members are preferably of the so-called "solid rubber" type comprising a plurality of rigid plates separated in a sandwich-type structure by rubber blocks, the rubber blocks being bonded to each adjacent plate. Preferably metal plates are used. References herein to solid rubber spring members should be construed accordingly.

The invention also embraces vehicles fitted with suspension systems as aforesaid.

It will be appreciated that the details of specific systems may vary considerably to suit different types of vehicles and the conditions under which they are to operate.

Several embodiments of the invention are now described, by way of example only, with reference to the accompanying drawings, in which.

Figure 1:
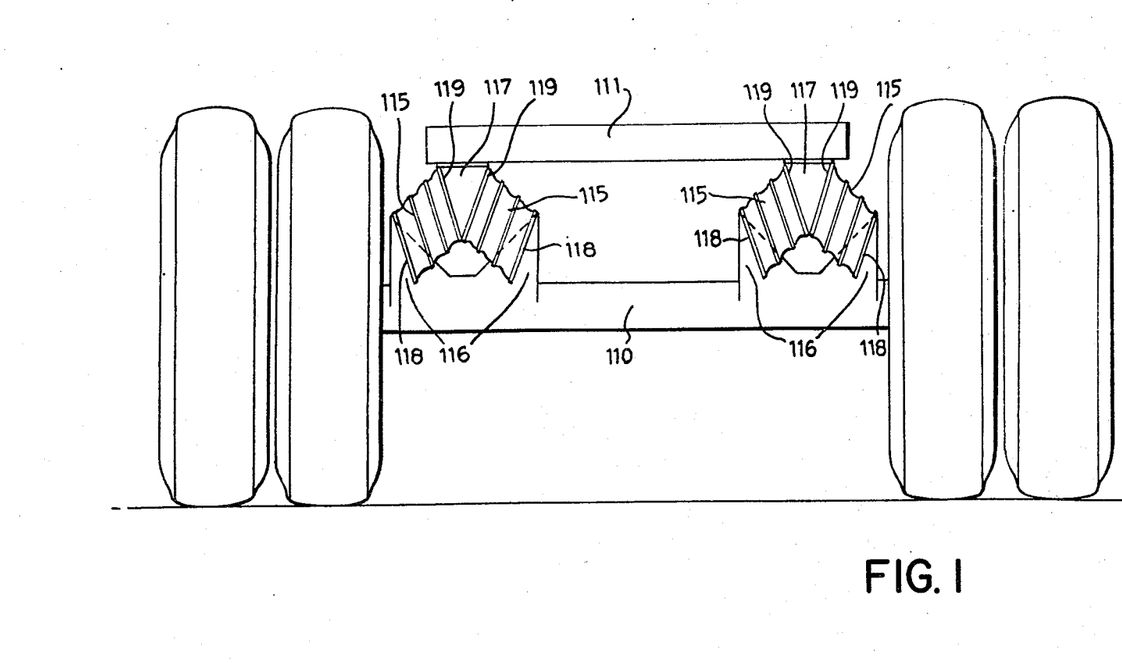
FIG. 1 shows diagrammatically an end view of a single axle suspension unit, illustrating the manner in which the axle is attached to the sub-frame.
Figure 2:
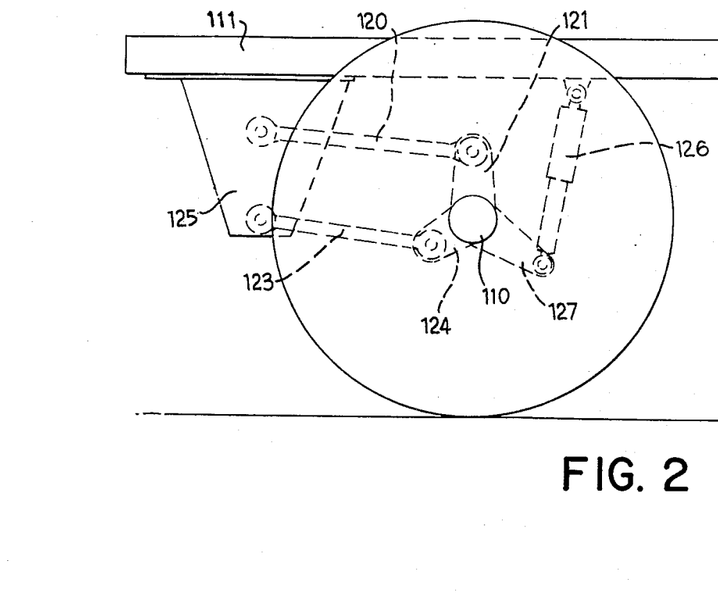
FIG. 2 shows diagrammatically a side view of the single axle suspension unit shown in FIG. 1, illustrating the manner in which the axle is located longitudinally.
Figure 3:
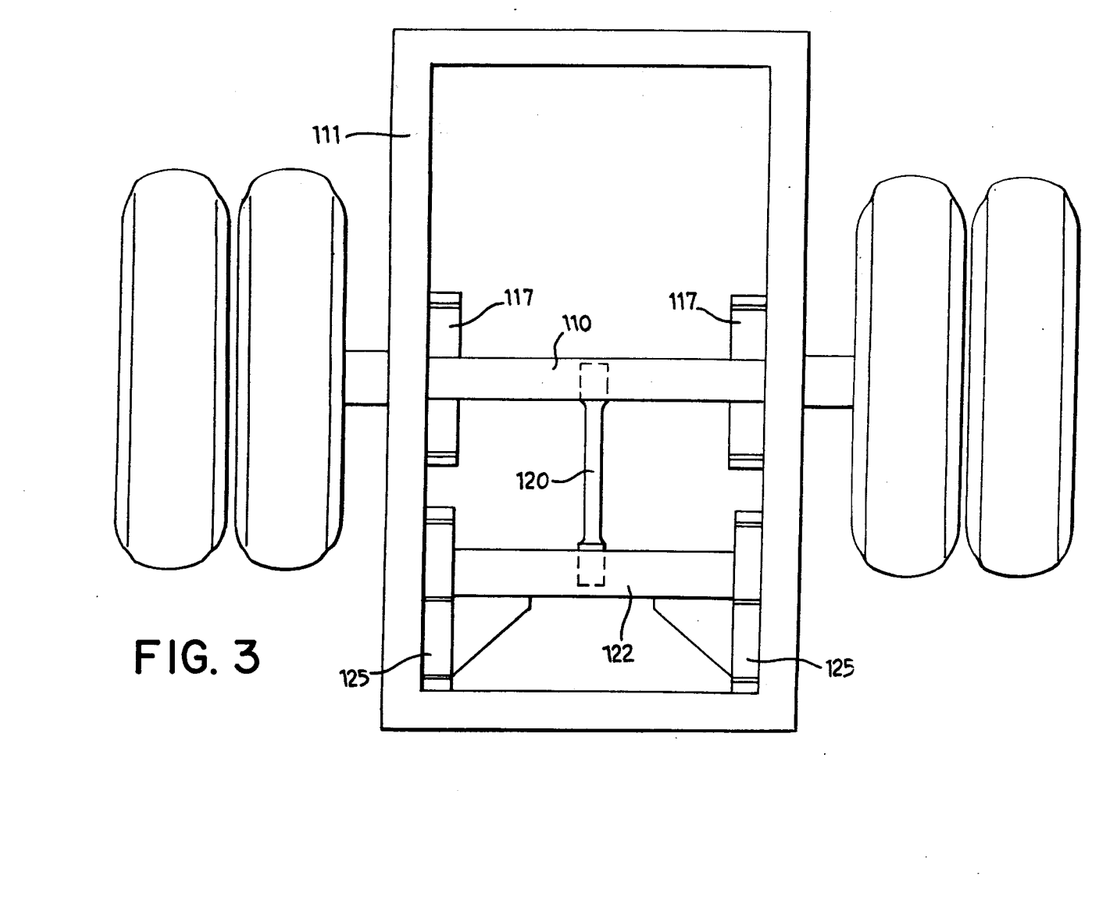
FIG. 3 shows diagrammatically a plan view of the single axle suspension unit shown in FIG. 1, illustrating the manner in which the axle is located longitudinally.

In the form of single axle unit shown in FIGS. 1, 2 and 3 the axle 110 is mounted at positions adjacent to its ends, to a sub-frame 111 by means of two pairs of solid rubber spring members 115 each comprising a plurality of metal plates separated by and bonded to rubber blocks to form a sandwich-type structure. The plates at the extreme ends of the spring members are provided with studs or other similar fastening means. Each spring member 115 is mounted between a bracket 116 secured to the axle 110 and a block 117 secured to the sub-frame 111. The supporting faces 118 and 119 of the bracket 116 and block 117 respectively are positioned so that when the spring members 115 are secured therebetween, their axes are inclined upwardly and lie in the vertical axial plane of the axle.

Means is provided to locate the axle 110 longitudinally with respect to the vehicle. For this purpose an upper torque rod 120 is connected between a bracket 121 mounted centrally of the axle 110 and a cross-member 122 on the sub-frame 111. A pair of lower torque rods 123 are positioned one at each side of the unit between brackets 124 provided adjacent the respective ends of the axle and brackets 125 which depend from the sub-frame 111 at either side of the unit. A pair of dampers 126 are provided owe at either side of the unit, each damper being connected between the sub-frame 111 and a bracket 127 provided adjacent the associated end of the axle. The torque rods and dampers are connected at their ends by rubber bushed connections.

Figure 4:
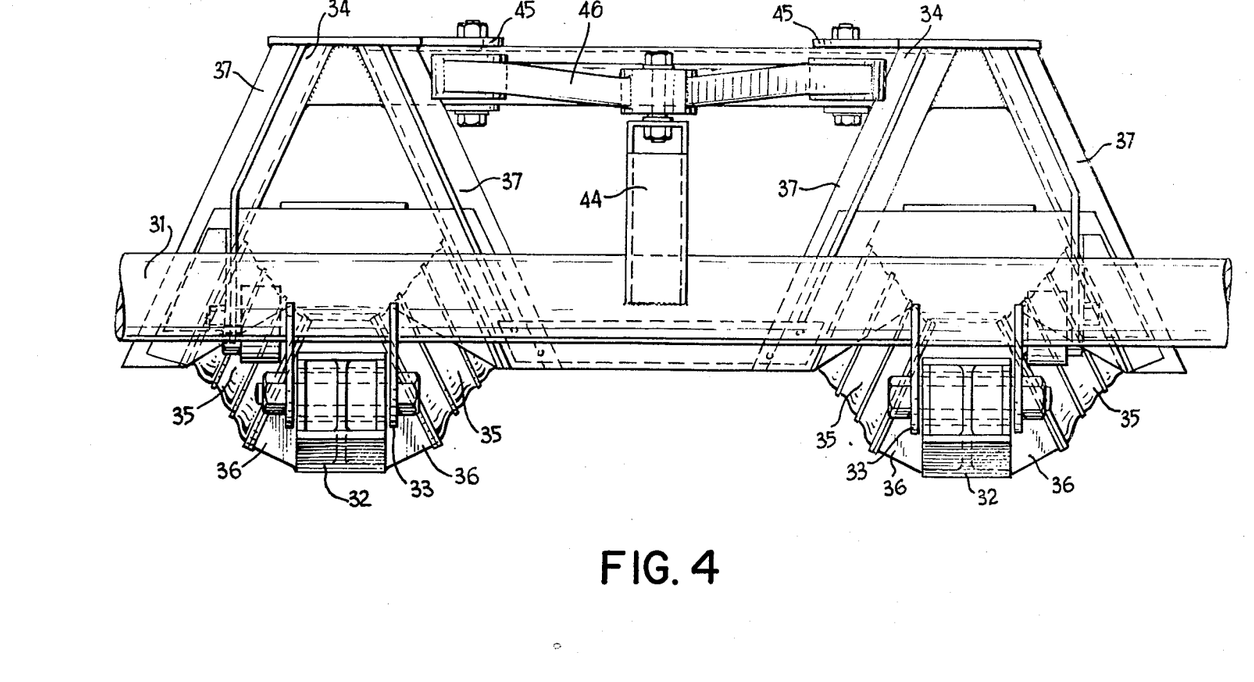
FIGS. 4, 5 and 6 show an end, side and plan view respectively of a tandem axle suspension unit.
Figure 5:
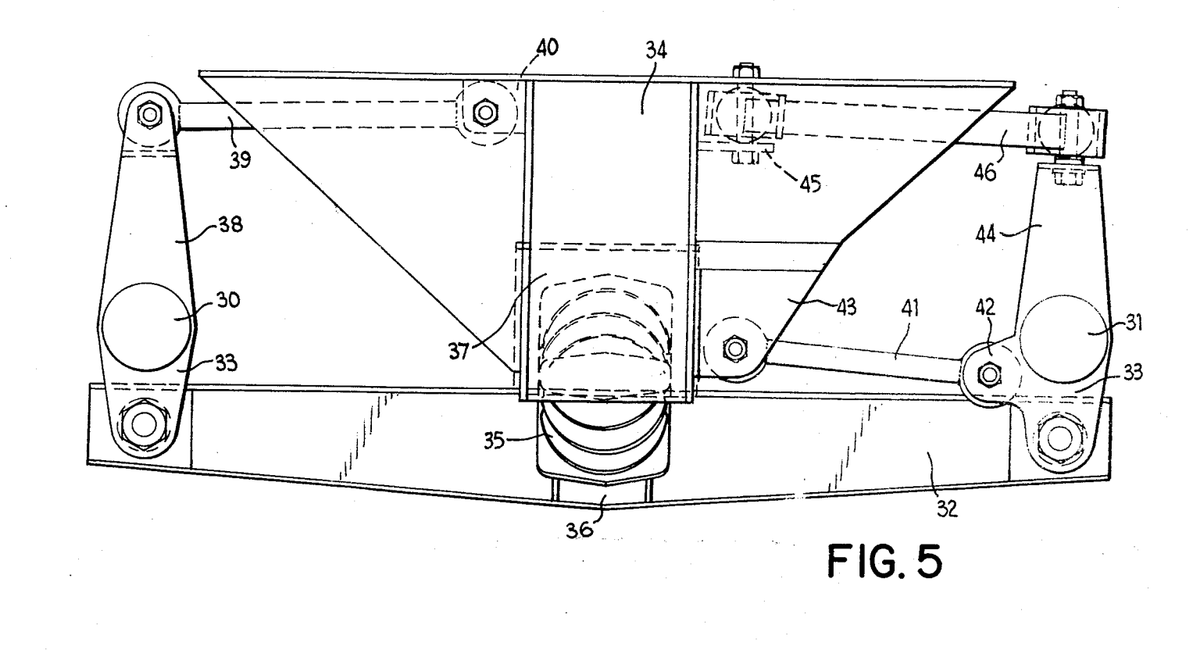
Figure 6:
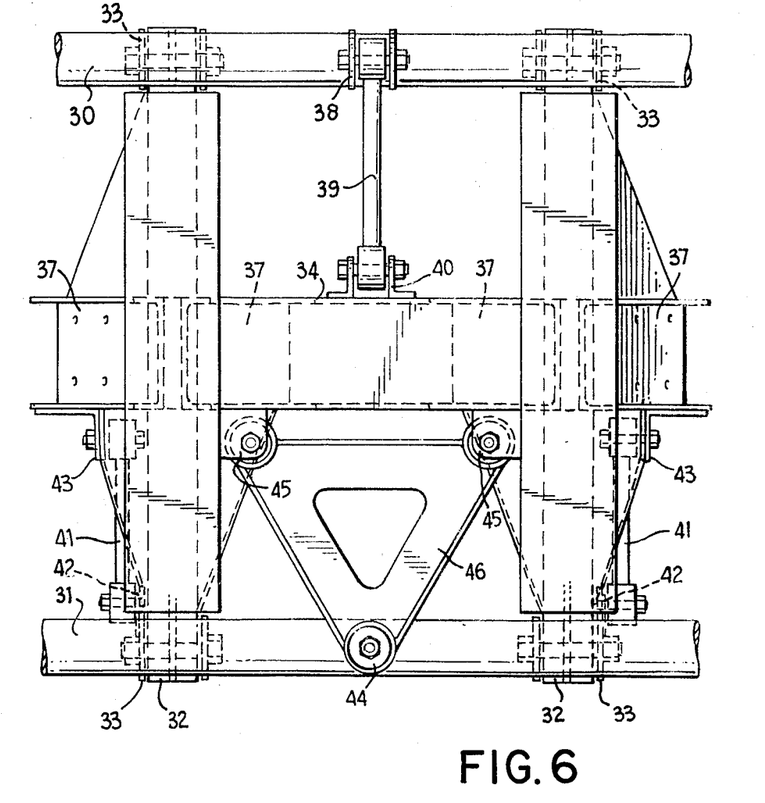

FIGS. 4, 5 and 6 show a tandem axle suspension unit comprising a pair of axles 30, 31 mounted at positions adjacent to each end on a pair of longitudinal beams 32 by means of axle brackets 33, the axle brackets 33 being connected to the ends of the longitudinal beams 32 by rubber bushed pivotal connections.

The longitudinal beams 32 are each connected to a sub-frame 34 by a pair of solid rubber spring members 35 of the type described with reference to FIGS. 1, 2 and 3. Each spring member 35 is mounted between a bracket 36 secured midway along the beam 32, and a suitably positioned member 37 of the sub-frame 34.

The supporting surfaces of the brackets 36 and members 37 are positioned so that the spring members 35 are inclined upwardly from the beams 32 at an angle to the vertical, the axis of each spring member 35 being in a vertical plane parallel to the vertical axial planes of the axles 30, 31.

An axle pillar 38 is mounted at the centre of the axle 30 and a torque bar 39 is connected by means of rubber-bushed pivotal connections between the upper end of the axle pillar 38 and a bracket 40 secured to the sub-frame 34.

The axle brackets 33 supporting the axle 31 are connected to the sub-frame 34 by respective torque rods 41 connected between lugs 42 provided on the axle brackets 33 and brackets 43 secured to the sub-frame 34. In addition an axle pillar 44 is provided at the centre of axle 31, this axle pillar 44 being pivotally connected to the sub-frame 34 by means of an "A" frame 46 secured to the axle pillar 44 and to two points 45 on the subframe 34 by spherical rubber bushes.

In a modified form of this tandem axle arrangement (not shown) the torque bar 39 which locates the axle 30 longitudinally with respect to the sub-frame 34 may be replaced by an A frame arrangement as used in association with the axle 31.

Dampers (not shown) are also provided between the axles 30 and 31, or the beams 32 supporting these axles, and the sub-frame 34 on either side of the suspension unit in order to damp the suspension.

The spring members used in this arrangement are designed to operate under compression and shear and they provide comparatively little torsional resistance. The spring members 35 thus allow sufficient rocking movement of the longitudinal beams 32 to maintain both axles 30 and 31 is contact with the ground when the vehicle is travelling over uneven surfaces.

Figure 7:
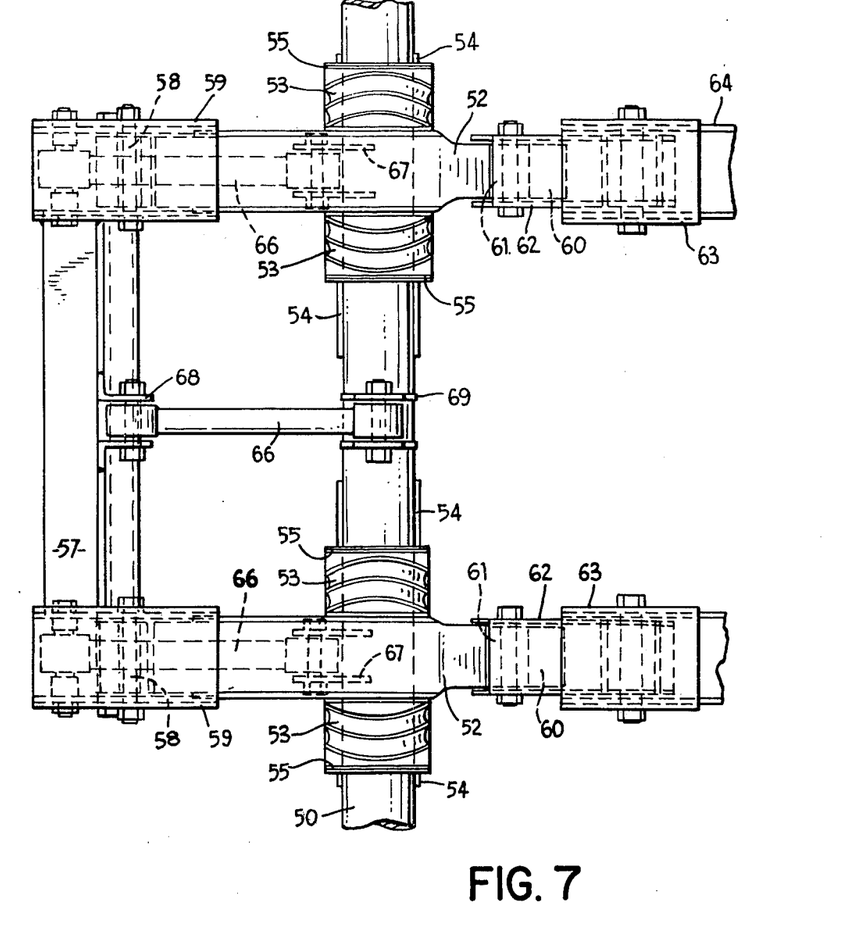
FIG. 7 shows a plan view of one axle assembly of a wide spread axle suspension unit.
Figure 8:
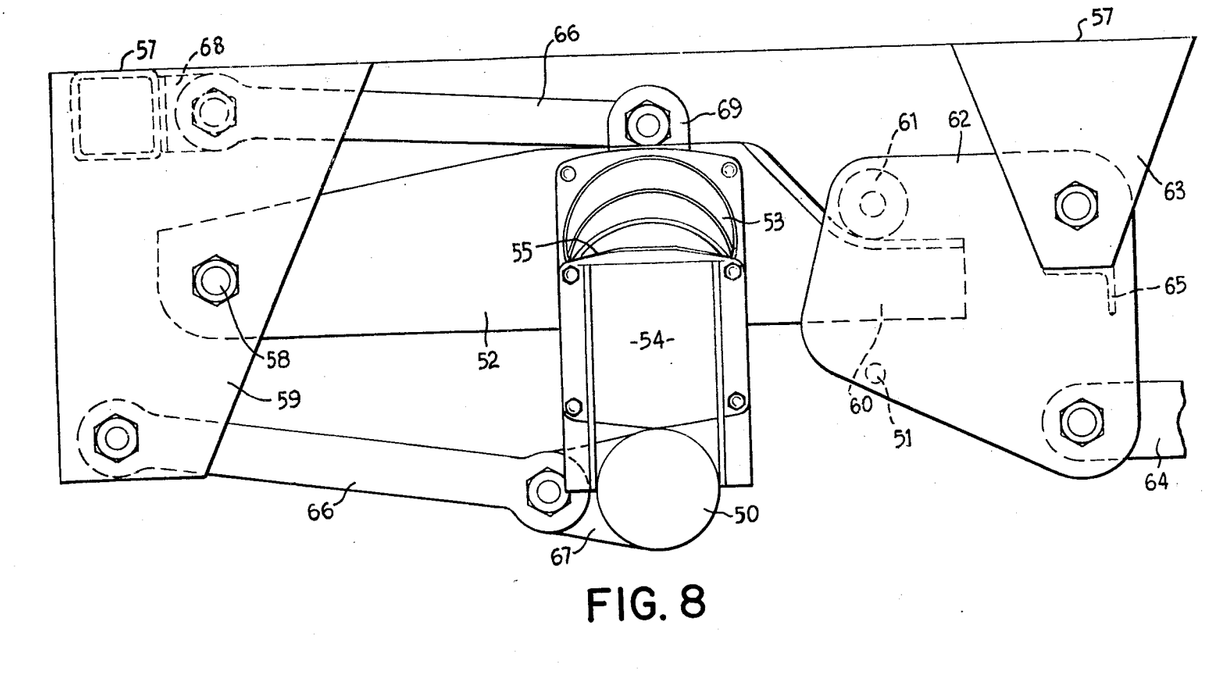
FIGS. 8 and 9 show a side and end view respectively, of the axle assembly shown in FIG. 7.
Figure 9:
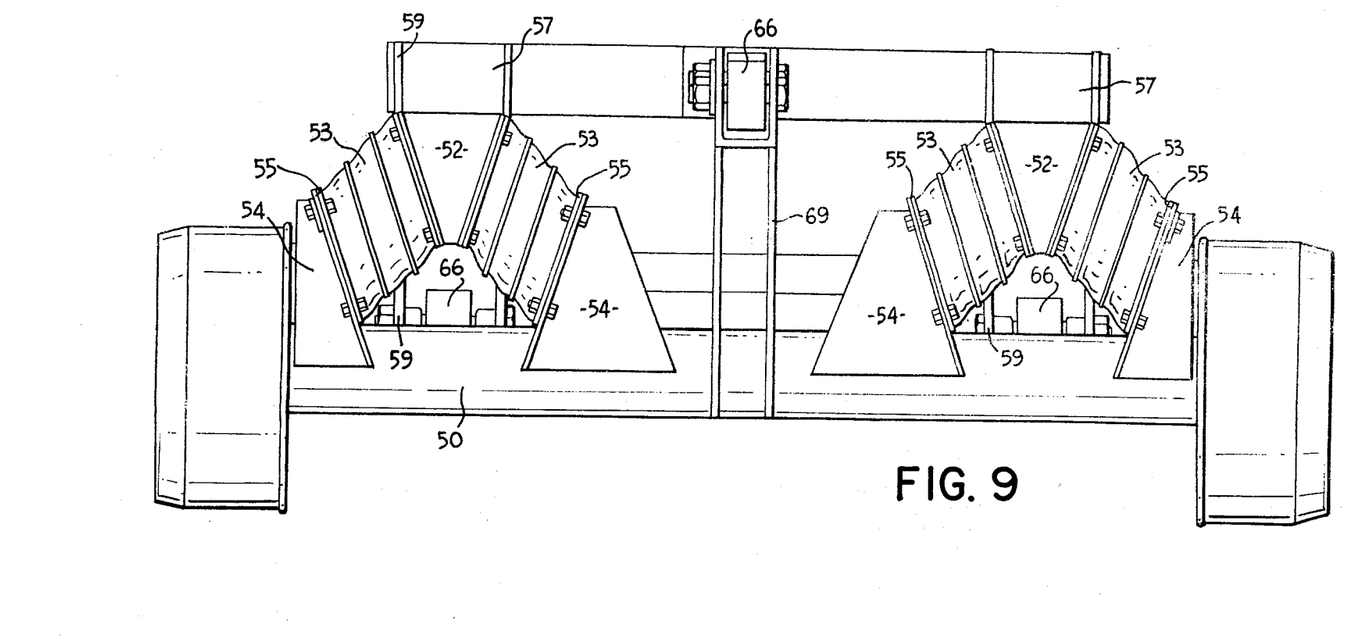

FIGS. 7, 8 and 9 show a wide-spread axle suspension unit comprising a pair of interconnected axles 50. These axles are each attached at either side to swing links 52 by means of respective pairs of solid rubber spring members 53 of the type described with reference to FIGS. 1, 2 and 3. The spring members 53 are mounted to the axles 50 by means of brackets 54 provided adjacent to the ends of the axles. The supporting faces 55 of the brackets 54 are positioned so that when the spring members 53 are secured thereto their axes are inclined upwardly at an angle to the vertical and lie in the vertical axial plane of the axle on which they are mounted. The upper ends of the spring members of each pair are secured one on either side of the associated swing link 52.

Each swing link 52 is pivotally connected at its end 58 to a bracket 59 secured to a sub-frame 57. The other end 60 of each swing link 52 is shaped for engagement with a roller 61 mounted at one end of an associated bell-crank lever 62 which is pivotally mounted on a bracket 63 secured to the associated side of the sub-frame 57. The other end of the bell-crank lever 62 is connected to the corresponding end of the other bell-crank lever at the same side of the suspension unit by a coupling link 64 so that when one axle is depressed the other will be extended. A stop 51 provided on the bell-crank lever 62, passes under the end 60 of swing link 52 and thereby prevents excessive downward movement of the axle should the wheels connected thereto come out of contact with the ground.

Each axle is located longitudinally in position by three torque rods 66, two of which are pivotally connected between brackets 67 secured to the axle adjacent to each end thereof and the bracket 59, and the third of which is pivotally connected between a bracket 68 secured to the sub-frame 57 and an axle pillar 69 mounted on the centre of the axle. All pivotal connections for the swing links 52, bell-crank levers 62 and torque rods 66 are rubber bushed connections. The torque rods 66 may be replaced by A frames similar to those described in connection with the tandem axle unit shown in FIGS. 4 to 6, the A frames being secured to the axle pillars 69 and sub-frame 57 by spherical rubber bushes. Dampers (not shown) are also provided between each axle and the sub-frame to damp the action of the spring members.

In this arrangement, the spring members 53 having very little torsional resistance, in addition to taking the load applied to the vehicle and transversely stabilizing the vehicle, also allow pivotal movement between the swing links 52 and the axles 50 so that as the swing links 52 move up and down as the suspension flexes the axles 50 may rotate to a small degree with respect to the swing links 52. This arrangement avoids the need for separate pivotal connections between the axles and swing links.

Furthermore instead of mounting both axle assemblies on a single sub-frame, the axle assemblies may be mounted on individual sub-frames so that the distance between the axle centres may be varied to suit the vehicle to which the suspension system is fitted, the coupling links 64 being made to the appropriate length.

Figure 10:
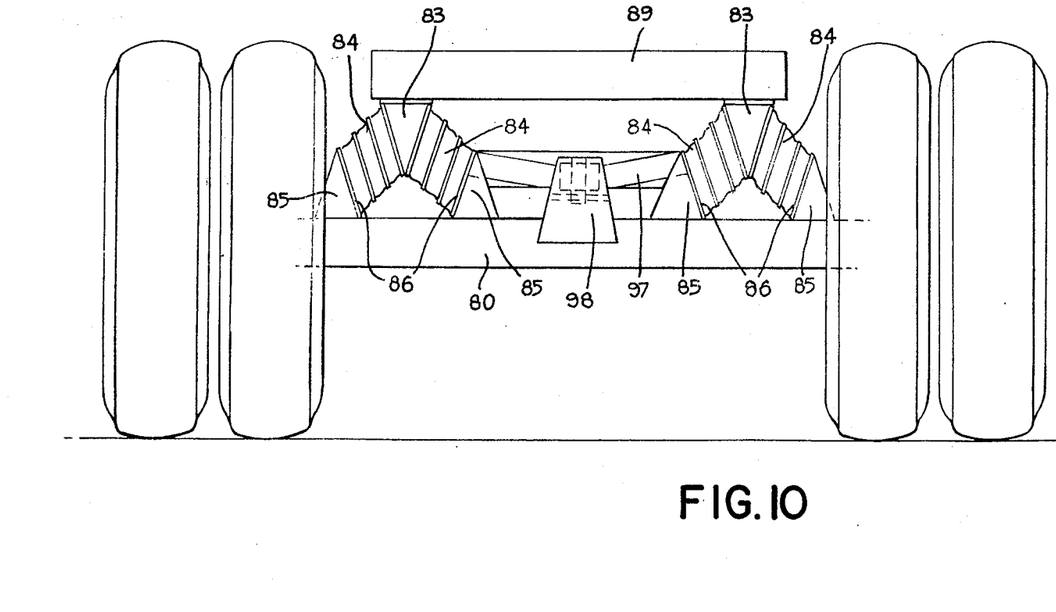
FIG. 10 shows diagrammatically an end view of a three axle suspension unit, illustrating the manner in which the outer axles are mounted to the sub-frame.
Figure 11:
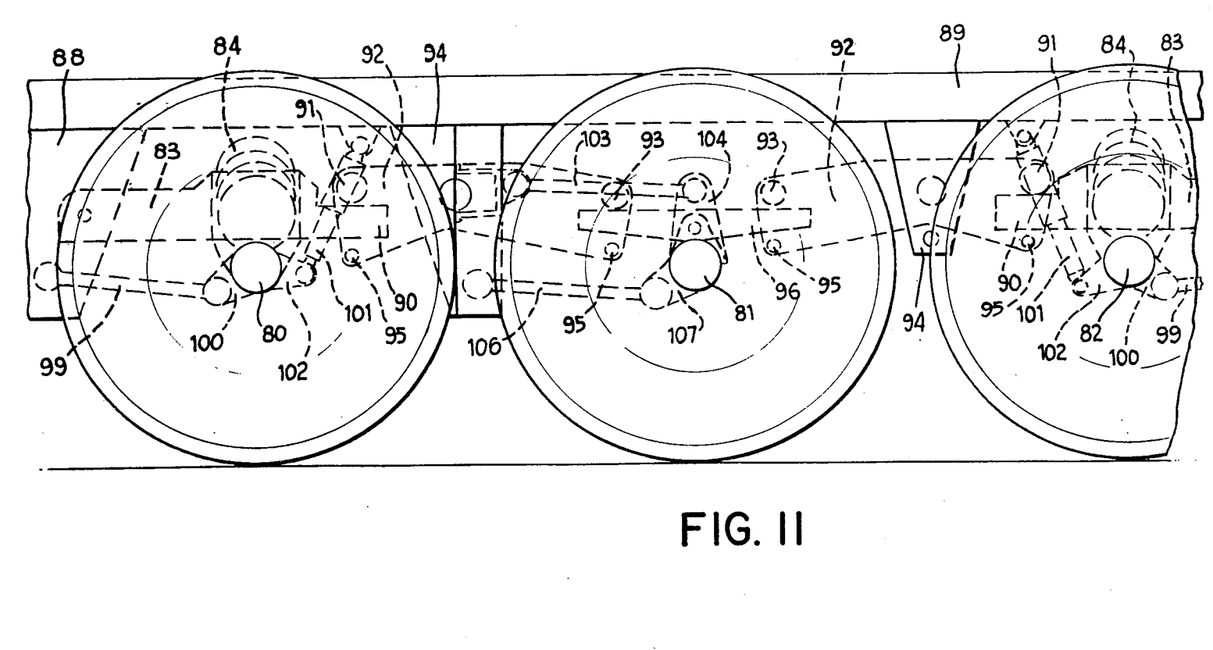
FIG. 11 shows diagrammatically a side view of the three axle suspension unit shown in FIG. 10, illustrating the manner in which the three axles are interconnected.
Figure 12:
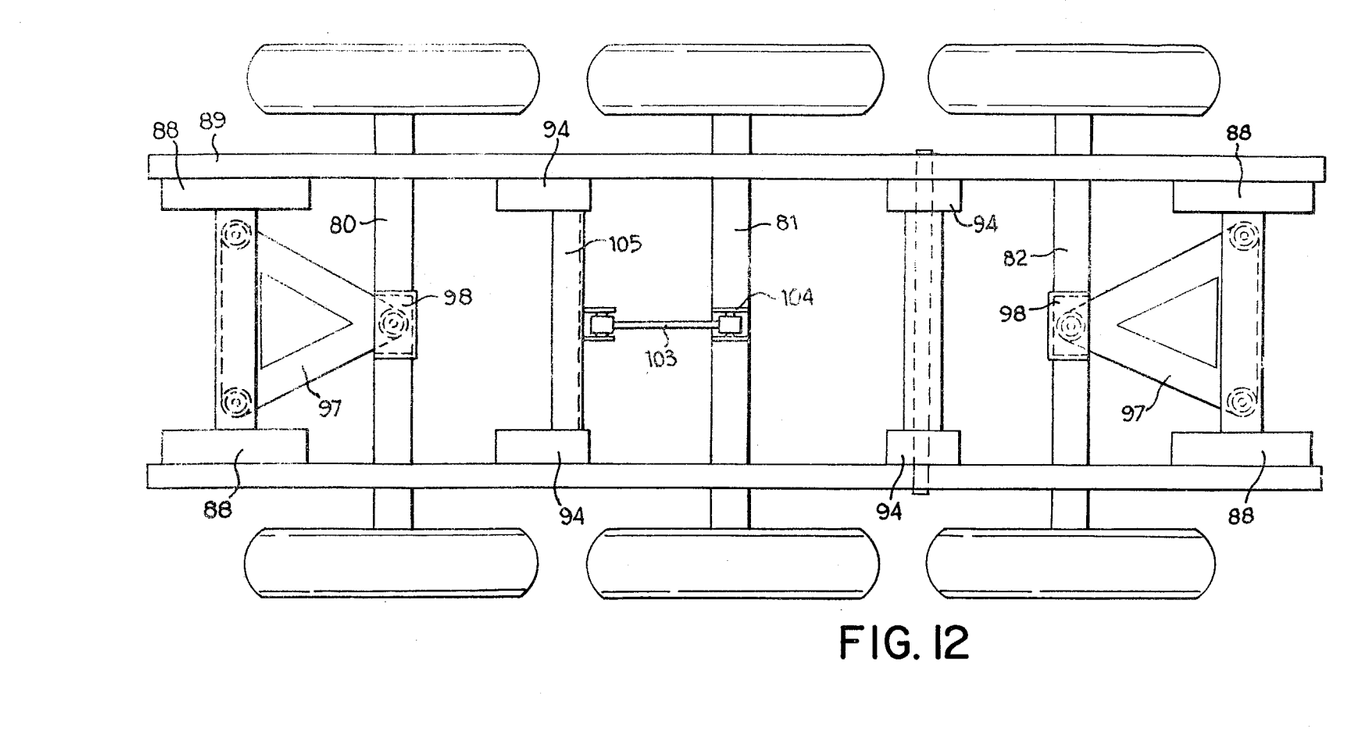
FIG. 12 shows diagrammatically a plan view of the three axle suspension unit shown in FIG. 10, illustrating the manner in which the three axles are located longitudinally with respect to the sub-frame.

FIGS. 10, 11 and 12 show a three axle suspension unit based on the widespread unit described above, the outer axles of the unit being supported by similar assemblies to those of the widespread unit.

The three axle unit comprises three axles 80, 81 and 82. Axles 80 and 82 are each attached at either side of the unit to one of four swing links 83 by means of a pair of solid rubber spring members 84 of the type described with reference to FIGS. 1, 2 and 3. The spring members 84 are mounted to axles 80 and 82 by means of brackets 85. The supporting faces 86 of the brackets 85 are positioned so that when the spring members 84 are secured thereto, their axes are inclined upwardly and lie in the vertical axial plane of the axle to which they are attached. The upper ends of each pair of spring members 84 are secured one on either side of the associated swing link 83.

Each swing link 83 is pivotally connected at one end to a bracket 88 which depends from a sub-frame 89 adjacent one of the corners of the latter. At its other end 90 each of the swing links 83 is shaped for engagement with a roller 91 mounted adjacent to one end of a rocker arm 92. Each rocker arm 92 has a second roller 93 mounted adjacent to its other end and is pivoted between its two ends to a bracket 94 depending from the sub-frame 89. The rocker arms 92 and rollers 93 are arranged so that the rollers 93 at each side of the unit engage with the respective ends of a beam 96 which is mounted on the axle 81. In this way all three axles are interconnected and can articulate during travel over uneven surfaces. Stops 95 provided at the ends of the rocker arms 92, pass under the ends 90 of the associated swing links 83 or under the associated beam 96 respectively and thereby prevent excessive downward movement of the axles should any of the wheels connected thereto come out of contact with the ground.

Axles 80 and 82 are located longitudinally by means of A frames 97 which are secured to axle pillars 98 mounted centrally on each axle 80, 82 and to the adjacent end of the sub-frame 89 by means of spherical rubber bushes. In addition torque rods 99 are secured at either side of the unit between brackets 100 on the axles and the brackets 88. Dampers 101 are also mounted at either side between brackets 102 on the axles and the sub-frame 89. Axle 81 is located longitudinally by means of a torque rod 103 extending between a bracket 104 located centrally of the axle and a cross member 105 of the sub-frame 89. In addition torque rods 106 are mounted at either side between brackets 107 and the brackets 94.

In this arrangement, like the wide-spread unit described above, the spring members 84 serve to allow rotation of the axles 80, 82 with respect to the swing links 83 in addition to taking the load applied to the vehicle and stabilizing the vehicle transversely.

The embodiments described thus provide suspension systems which in addition to stabilizing the vehicle vertically also stabilize the vehicle transversely thus reducing the amount of roll. In addition, as the spring members do not have to cope with longitudinal vibrations due to drive reaction and braking, the life of the members will be increased. Tire mileage will also be improved as the axles are maintained in constant alignment. Furthermore, as described above the spring members used in this invention are designed to operate under compression and shear and they provide comparatively little torsional resistance; they will therefore allow relative pivotal movement of the parts of the suspension system between which they are mounted and consequently will avoid the need for separate pivotal connections where such movement is required.

Various modifications may be made without departing from the invention. For example while the embodiments described above relate to fixed axles, the invention may be adapted for use with either fixed or driven axles. Moreover while reference has been made to the use of solid rubber spring members, other forms of spring member could be utilized and resilient materials other than rubber could be employed provided they had the necessary properties. It should also be appreciated that while it is intended in most instances that the spring members should be arranged with their axes at right angles to the intended direction of movement of the vehicle, they could in some instances be arranged in other transverse dispositions. Thus the axes of the spring members could be angled forwardly or rearwardly so as to present some resistance to longitudinal loads and the term "transverse" used herein and in the appended claims should be construed accordingly. The invention is also applicable to rail as well as road vehicles.

I claim:

1. A vehicle suspension system including an axle structure comprising at least one axle, and a vehicle-supporting frame structure, wherein the improvement comprises a pair of mountings for pivotally supporting the frame structure on the axle structure at each end of said axle, each mounting consisting of a pair of spring members, located adjacent to one end of said axle, each of which extends between a rigid portion of the axle structure and a rigid portion of the frame structure and comprises a plurality of rigid plates separated in a sandwich-type structure by blocks of resilient material secured to each adjacent plate, the axes of each pair of spring members extending transversely to the direction of travel of the vehicle and being upwardly inclined relative to each other at equal and opposite angles, and each spring member being designed to operate under compression and shear to support the frame structure, but having relatively little torsional resistance so that it operates as a pivotal support.

2. A vehicle suspension system according to claim 1 in which the angles of inclination of the axes of the spring members to the vertical are from 17° to 27°.

3. A vehicle suspension system according to claim 1 wherein the axle structure comprises a single axle, and each spring member is mounted between a bracket secured to the axle and the frame structure, the supporting surfaces of the bracket and frame structure being such that when the spring members are mounted therebetween the axes of the members of each pair are inclined upwardly from said axle at said equal and opposite angles and lie in the vertical axial plane of the axle, means being provided to locate the axle longitudinally with respect to the frame structure.

4. A vehicle suspension system according to claim 1 wherein the axle structure comprises a pair of axles mounted parallel to one another adjacent the ends of a pair of longitudinal beams and pivotally connected thereto by brackets attached to the axles adjacent to the respective ends thereof, the pairs of spring members being disposed between supporting surfaces on the beams and on the frame structure so that the axes of the spring members of each pair are inclined upwardly from said beams at said equal and opposite angles in a plane parallel to the vertical axial planes of the axles, and means connecting the axles to the frame structure to locate the axles longitudinally with respect to the frame structure.

5. A vehicle suspension system according to claim 1 wherein the axle structure comprises a pair of axle assemblies each comprising an axle mounted adjacent its ends on associated swing links of the frame structure by means of a pair of said spring members, the spring members being connected between brackets on the axle and the associated swing links so that the axes of the members of each pair are inclined upwardly from said axle at said equal and opposite angles in the vertical axial plane of the axle, each of said swing links being pivotally connected at one end to a sub-frame of the frame structure, the other end of each swing link engaging a roller mounted at one end of a bell crank lever pivotally connected to the sub-frame, and means for locating the axles longitudinally with respect to the sub-frame, said axle assemblies being interconnected at each side of the suspension system by links connected between the free arms of the bell-crank levers at that side whereby to connect the two axles in articulated fashion.

6. A vehicle suspension system according to claim 1 wherein the axle structure comprises three axles positioned parallel to one another, each outer axle being mounted by means of said spring members on a pair of swing links of the frame structure located one adjacent each end of the axle, one pair of spring members being mounted between brackets adjacent each end of the axle and the associated swing links so that the axes of the spring members of each pair are inclined upwardly from said axle at said equal and opposite angles in the vertical axial plane of the axle, each of said swing links being pivotally connected to a sub-frame of the frame structure adjacent to one of the corners of the subframe, the other end of each swing link engaging a roller mounted on one end of a rocker arm which is provided with a roller at each end and is pivoted to the sub-frame between the two rollers, the other rollers of the rocker arms engaging the respective ends of a pair of longitudinal beams which are mounted one adjacent each end of the central axle, whereby the three axles are connected to one another in articulated fashion, and means for locating each of the three axles longitudinally with respect to the sub-frame.

* * * * *